(12) United States Patent
Ishibashi et al.

(10) Patent No.: US 7,695,346 B2
(45) Date of Patent: Apr. 13, 2010

(54) ABRASIVE, A METHOD FOR MANUFACTURING THE ABRASIVE, AND A METHOD FOR BLAST PROCESSING WITH THE USE OF THE ABRASIVE

(75) Inventors: Shozo Ishibashi, Tokyo (JP); Keiji Mase, Tokyo (JP)

(73) Assignee: Fuji Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/190,151

(22) Filed: Jul. 25, 2005

(65) Prior Publication Data

US 2006/0099888 A1    May 11, 2006

(30) Foreign Application Priority Data

Nov. 11, 2004   (JP) .............................. 2004-328271

(51) Int. Cl.
*B24C 1/00*    (2006.01)
*B24C 11/00*   (2006.01)

(52) U.S. Cl. ........................... 451/39; 451/330; 451/526

(58) Field of Classification Search .................. 451/39, 451/330, 526
See application file for complete search history.

(56) References Cited

U.S. PATENT DOCUMENTS 2,328,998 A * 9/1943 Radford ....................... 451/536
2,418,250 A * 4/1947 Drake .......................... 51/299
3,684,466 A * 8/1972 Petrone ........................ 51/298
5,092,084 A * 3/1992 Schlick ........................ 451/95

(Continued)

FOREIGN PATENT DOCUMENTS

JP   S55-98565    7/1980
JP   2957492      12/1997
JP   3376334      7/2001

OTHER PUBLICATIONS http://www.britannicia.com/EBchecked/topic/657336/zinc-oxide "Zinc oxide (chemical compound)—Britannica Online Encyclopedia".
http://www.britannica.com/EBchecked/topic/633433/vulcanization.

*Primary Examiner*—Maurina Rachuba
(74) *Attorney, Agent, or Firm*—Porzio Bromberg & Newman, P.C.

(57) ABSTRACT

An abrasive, which makes it possible to polish a surface to be processed of a workpiece with a blast processing, and together therewith, can bear using for a long period of time or a plurality of times, and a method for blast processing with the abrasive are provided. The abrasive is composed of a base material as an elastic body and abrasive grains, wherein the abrasive grains of 10 to 90% by weight are compounded and dispersed into the base material of 90 to 10% by weight such that a content rate (compounding ratio) of the abrasive grains in the abrasive is 10 to 90% by weight when an amount of the abrasive is 100% by weight. The method for blast processing includes a step of injecting or projecting the abrasive at a predetermined angle of incidence with respect to the surface to be processed of the workpiece.

17 Claims, 5 Drawing Sheets

U.S. PATENT DOCUMENTS

| | | | |
|---|---|---|---|
| 5,261,191 A * | 11/1993 | Wick | 451/39 |
| 5,373,047 A * | 12/1994 | Schnelle et al. | 524/439 |
| 6,146,247 A * | 11/2000 | Nokubi et al. | 451/40 |
| 6,273,788 B1 * | 8/2001 | Shaw | 451/38 |
| 6,568,994 B1 * | 5/2003 | Shaw | 451/36 |
| 6,767,488 B2 * | 7/2004 | Shaw et al. | 264/45.3 |
| 6,774,152 B2 * | 8/2004 | Shaw et al. | 521/99 |
| 6,817,927 B2 * | 11/2004 | Smith et al. | 451/38 |
| 7,144,303 B2 * | 12/2006 | Kamimura et al. | 451/38 |

FOREIGN PATENT DOCUMENTS

* cited by examiner (A)  (B)

(A)

(B)

ABRASIVE, A METHOD FOR MANUFACTURING THE ABRASIVE, AND A METHOD FOR BLAST PROCESSING WITH THE USE OF THE ABRASIVE

BACKGROUND OF THE INVENTION

1. Field of the Invention

The present invention relates to an abrasive, a method for manufacturing the abrasive, and a method for blast processing with the use of the abrasive. More specifically, the present invention relates to an abrasive used for various sorts of processing such as gloss finishing, glazing, mirror finishing, smoothing or processing of hairline pattern of a surface to be processed of a workpiece, or cutting, cleaning, deburring of the surface to be processed of the workpiece, and a method for manufacturing of the abrasive, and further a method for blast processing to perform a desired process as described above for the workpiece by injecting or projecting the abrasive onto the surface to be processed of the workpiece.

The "a method for blast processing" according to the present invention widely includes not only pneumatic blast processing methods such as a dry blast one and a wet blast one in which the abrasive is injected with the use of compressed fluid such as compressed air, but also blast processing methods capable of projecting the abrasive at a predetermined injection speed or at an injection angle onto the surface to be processed of the workpiece, such as a centrifugal type (impeller type) one in which an impeller is rotated to impart a centrifugal force to the abrasive for projection, and a flat casting type one in which the abrasive is struck with use of a hammering rotor for projection.

2. Description of the Prior Art

As a polishing for improving a surface roughness of the surface to be processed of the workpiece, and for mirror-finishing or gloss-finishing the surface, the polishing with a polishing paper or polishing cloth, the polishing with a buff, lapping, the polishing by contacting with rotating abrasive grains, the polishing by contacting with abrasive grains to which ultrasonic vibration is given, and the like are generally used, but the blast processing is not used. The reason is that satin-finished uneven portions are formed on the surface because the blast processing is one for injecting or projecting the abrasive onto to the workpiece, thereby to cause the abrasive to collide with the surface to be processed of the workpiece.

As described above, generally, the blast processing does not permit the surface of the workpiece to be processed into a glossy surface such as a mirror surface. However, the method for blast processing has been proposed in which the satin surface is prevented from being formed on the surface of the workpiece and the surface of the workpiece can be polished.

For instance, there are grinding and polishing methods as follows. In a grinding method, the abrasives, which are composed by attaching grinding powder to a carrier made of an elastic porous plant fiber with a fat content or a sugar content included in the plant fiber as an adhesive, are mixed with a grinding liquid and then injected numerously onto the surface of the workpiece obliquely for collision. With the carrier plastically deformed, the abrasives are caused to slide on the surface to be processed of the workpiece, and the surface of the workpiece is finished with the grinding powder (refer to Japanese Patent No. 2957492). In a polishing method, the abrasive including a nucleus having desired elasticity and adhesion obtained by containing water and a plurality of abrasive grains adhering to a surface of the nucleus owing to the adhesion is used. And the abrasive is injected onto the workpiece for collision in a state where water is held in the nucleus of the abrasive, and thus, the surface of the workpiece is polished (refer to Japanese Patent Application Laid-Open No. 2001-207160).

Additionally, as an abrasive to make the grinding process as described above possible, a granular abrasive provided with one or a plurality of abrasive grains and an elastic material which is integrally bonded with the abrasive grains and has larger coefficient of restitution than the abrasive grains has been proposed (refer to Japanese Utility Model Application Laid-Open No. S55(1980)-98565)

SUMMARY OF THE INVENTION

According to the grinding and polishing methods or the abrasive described in the above prior Patent and Utility Model publications, the surface of the workpiece can be grinded/polished not with the conventional polishing method using the polishing cloth, the polishing paper, the buff, the rotating grind stone or the like, but with the method for blast processing.

However, in the method described in the above-mentioned Japanese Patent No. 2957492, the carrier of the abrasive for use is generated from a plant fiber, whereby it is necessary to inject the abrasive at a lower injection speed, and as a result, polishing efficiency is deteriorated because, for instance, when the abrasive is injected at an injection pressure generally applied in a pneumatic blast processing, the abrasive is crushed and broken, which prevents the abrasive from carrying out a function as an abrasive.

Additionally, the abrasive is composed by attaching polishing powder to the carrier with a fat content or a sugar content included in the plant fiber composing the carrier as an adhesive, whereby due to processing heat or mechanical energy such as frictional heat generated when the abrasive collides with the workpiece, the polishing powder attached to the carrier is separated and falls off, or the like as time passes, and a polishing power of the abrasive is deteriorated. For the reason, after a certain period of processing time has passed, an abrasive regenerating step to supply the adhesive or the polishing powder is required in order to attach the polishing powder to the carrier freshly.

Further, when the processing heat permits moisture in the carrier to evaporate, the carrier deteriorates in not only adhesion but also elasticity, and moreover is cured, or the like. Thus, the problem exists that the surface of the workpiece has the satin finish formed and polishing efficiency is deteriorated.

Furthermore, in the method described in the above mentioned 2001-207160, the nucleus of the abrasive for use has a desired elastic force and adhesion obtained by containing water, whereby similarly to the method described in Japanese Patent '492, when the processing heat or the like generated at the time of collision with the workpiece permits moisture of the nucleus to evaporate, the abrasive deteriorates in an ability of holding abrasive grains, the abrasive grains are separated and fall off, and thus, polishing efficiency is deteriorated. In addition hereto, like the foregoing problem, the problem exists that the nucleus lowers in an elastic force and is cured, whereby the surface of the workpiece does not come into a desired processing state, for instance, it is satin-finished. For the reason, after a certain period of processing time has passed, an abrasive regenerating step to freshly impart and supply moisture to the nucleus is required or special processing of adding an evaporation inhibitor to the nucleus in advance is required.

On the other hand, the carrier of the abrasive described in Japanese Utility Model Publication No. S55(1980)-98565 does not contain moisture, which is different from that of the abrasive having moisture according to the above mentioned prior Patent '492 and Publication 2001-207160. The problem that the processing heat generated at the time of collision with the workpiece permits moisture of the carrier to evaporate does not arise, whereby there is no possibility that the elastic force of the carrier which holds abrasive grains, a holding power of abrasive grains or the like are changed and polishing efficiency is deteriorated.

However, even in a case of using the abrasive described in the Utility Model S55(1980)-98565, when the workpiece is processed, the processed surface thereof has the uneven portions, which are still satin-finished, formed, and the problem exists that the abrasive is not suitable for polishing such as mirror finishing.

When the surface of the workpiece is processed into a mirror surface or the like by projection of the abrasive, it is necessary to slide the projected abrasive along the surface of the workpiece. However, the abrasive described in the S55 (1980)-98565 assumes a configuration essentially requiring that "an elastic material having a larger coefficient of restitution" be used as a carrier, whereby the abrasive colliding with the workpiece does not slide on the surface to be processed of the workpiece but recoils, or the sliding distance becomes shorter even in case where the abrasive slides on the surface, depending on the elastic force of the carrier, and it is considered that the abrasive is not suitable for polishing such as mirror finishing.

As described above, an object of the present invention is to provide an abrasive, which has a relatively simple structure, makes it possible to perform the blast processing such as polishing or cutting for improving surface roughness of the surface to be processed of the workpiece into a glossy surface such as a mirror surface with the use of an existing blast processing device with high efficiency, and can bear using for a long period of time or a plurality of times, and a method for manufacturing of the abrasive, and a method for blast processing with the use of the abrasive.

In order to achieve the object described above, an abrasive of the present invention includes a base material as an elastic body, and abrasive grains, wherein the abrasive grains of 10 to 90% by weight are compounded and dispersed into the base material of 90 to 10% by weight such that a compounding ratio (content rate) of the abrasive grains in the abrasive is 10 to 90% by weight when the abrasive is 100% by weight.

A compounding ratio of the abrasive grains in the abrasive is preferably 60 to 90% by weight with respect to the abrasive of 100% by weight, and more preferably, the abrasive grains of equal to or more than 70% by weight are compounded therein.

Further, a method for manufacturing of the abrasive according to the present invention includes the steps of: kneading abrasive grains of 10 to 90% by weight with a polymer raw material and a compounding agent as a base material of 90 to 10% by weight; and then, forming the abrasive into a granule. And thus, the compounding ratio of the abrasive grains with respect to the abrasive of 100% by weight is 10 to 90% by weight.

Furthermore, a method for blast processing of the present invention includes the step of: injecting or projecting the abrasive according to the present invention at an angle of incidence that is inclined at a predetermined angle with respect to a surface to be processed of a workpiece. The angle of incidence is preferably 0 to 70°, more preferably 0 to 60°, and by way of an example, is 45°.

The abrasive according to the present invention is composed of a base material as an elastic body and the abrasive grains therein, and the compounding ratio (content rate) of the abrasive grains in the abrasive is assumed to be within a predetermined range, which makes it possible to reduce an impact resilience modulus of the abrasive while a bonding between the abrasive grains and the base material is maintained in the abrasive and to perform better polishing or cutting.

That is, composing the abrasive by compounding/dispersing the abrasive grains of 10 to 90% by weight in the base material as an elastic body of 90 to 10% by weight, makes it possible to prevent a dent from being formed by absorbing/easing an impact generated by collision with the elastic force of the base material at the moment that the abrasive is injected or projected onto the surface to be processed of the workpiece to collide with the surface of the workpiece, and to adjust the impact resilience modulus of the abrasive with the elastic force of the base material such that after the collision with the surface to be processed, the abrasive is prevented from recoiling without sliding on the surface to be processed or with a less sliding distance. Therefore, the satin-finished uneven portions can be prevented from being formed on the surface to be processed, and the abrasive can slide along the surface of the workpiece suitably.

Moreover, setting the compounding ratio (content rate) of the abrasive grains in the abrasive of 100% by weight to equal to or more than 10% by weight makes it possible to prevent a grinding force and a processing ability caused by an extremely low density of the abrasive grains existing on the abrasive surface from deteriorating and to maintain high processing efficiency.

Still further, setting the compounding ratio of the abrasive grains in the abrasive of 100% by weight to equal to or less than 90% by weight makes it possible to maintain a state of the bonding between the abrasive grains and the base material, to prevent the abrasive from being significantly crushed due to collision energy when the abrasive collides with the surface to be processed of the workpiece, to prevent the surface from becoming a satin finished surface by the crushed abrasive, and to cause the abrasive to suitably slide along the surface of the workpiece.

In addition, even when the base material has a material quality which may cause a dust explosion, setting the content rate of the abrasive grains composed of a material which does not cause a dust explosion with respect to the abrasive of 100% by weight to equal to or more than 70% by weight enables the dust explosion caused by the atomized abrasive to be prevented.

Still furthermore, in the abrasive of the present invention, the abrasive grains are not only attached to the base material surface but also dispersed into the base material. Even when the abrasive grains existing on the base material surface of the abrasive are pulled out, separated, crushed, worn or the like due to various sorts of impacts or frictions generated in the blast processing steps such as injection onto the workpiece, polishing or cutting of the surface of the workpiece or collecting or diversion of the abrasive, new abrasive grains in the base material are exposed to the surface because the base material is also worn or crushed by the impacts or frictions in the blast processing step. Thus, a grinding ability of the abrasive can be maintained.

Therefore, the abrasive of the present invention, which is excellent in durability and does not require an abrasive regenerating step, can be used for a long period of time and a plurality of times, and can be suitably used for an abrasive recycling process line.

Also, according to the method for blast processing of the present invention, desired polishing, cutting or the like can be performed for the surface to be processed with a simple method of injecting or projecting the abrasive of the present invention onto the surface to be processed of the workpiece at a predetermined angle of incidence.

Particularly, setting the angle of incidence within a range of 0 to 70° makes it possible to prevent the abrasive colliding with the surface to be processed from recoiling and to permit it to suitably slide on the surface to be processed. Thus, while the satin-finished uneven portions are prevented from being formed on the surface to be processed, the desired blast processing such as polishing and cutting can be performed more suitably for the surface.

BRIEF DESCRIPTION OF THE DRAWINGS

The objects and advantages of the invention will become understood from the following detailed description of preferred embodiments thereof in connection with the accompanying drawings in which like numerals designate like elements, and in which.

DETAILED DESCRIPTION OF THE PREFERRED EMBODIMENT

Figure 1:
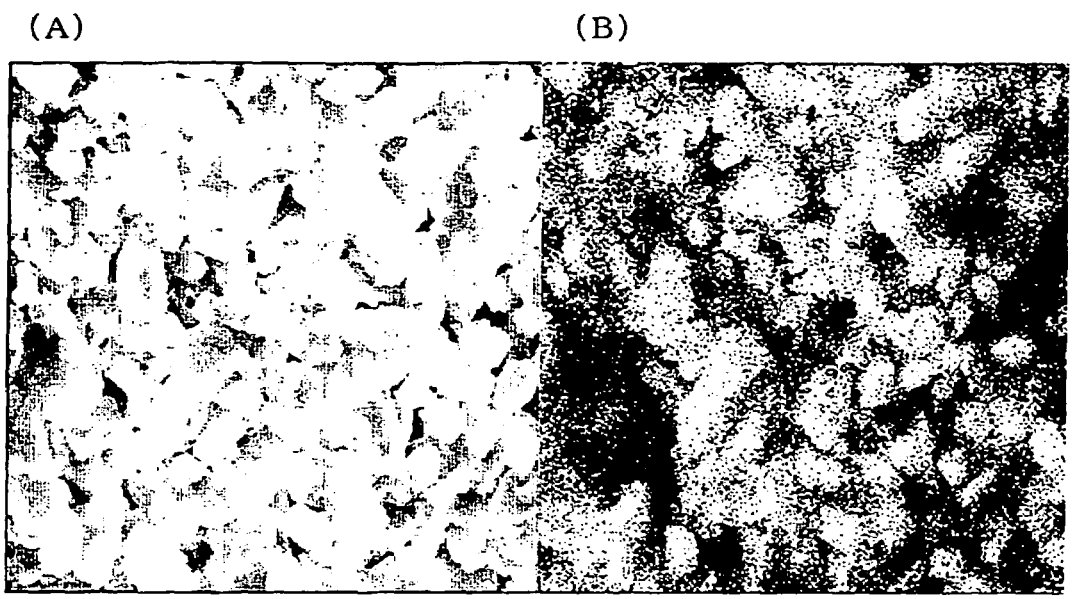
FIG. 1 is a view showing a surface observation result at the time of manufacturing the abrasive according to the present invention (before being used in a blast processing). (A) shows a scanning electron microscope (SEM) image and (B) shows an image obtained by an elemental analysis with an energy dispersive X-ray analyzer.

Embodiments of the present invention will be described as follows.

Abrasive

The abrasive of the present invention is composed of an elastic body as a base material and abrasive grains having a grinding ability, which are dispersed into the base material. With the use of an elastic force of the base material, when the abrasive collides with the surface to be processed of the workpiece, a dent is suitably prevented from being formed on the surface to be processed. Further, setting the content rate of the abrasive grains in the abrasive within a predetermined range, thereby to reduce an impact resilience modulus of the abrasive makes it possible to prevent the abrasive, which collides with the surface to be processed, from recoiling owing to the elastic force of the base described above, and to perform the blast processing such as polishing or cutting while the satin-finished uneven portions is prevented from being formed on the surface by causing the abrasive to slide on the surface to be processed while absorbing an impact generated at the time of collision with the surface to be processed.

Furthermore, a particle size of the abrasive is not limited in particular and can be changed as necessary in accordance with a material quality of the abrasive or a material to be treated, which becomes an object of processing, a purpose of processing, or the like. By way of an example, a particle diameter may be between 3 mm to 0.02 mm. Especially, in cutting and polishing of a minute area, it is effective to use a fine abrasive of a small particle diameter.

Moreover, when the fine particle of which the average particle diameter is equal to or less than 1 μm (#8000) is used as an abrasive grain included in the abrasive, by making the particle diameter of the abrasive smaller, a density of the abrasive grains per unit area of the abrasive surface can be increased, and there is an advantage that the abrasive grains can be effectively used.

Hereinafter, the base material and abrasive grains that compose the abrasive, their compounding ratios and the method for manufacturing of the abrasive will be described.

Base Material

The base material in the abrasive of the present invention, which is a carrier to carry abrasive grains having a grinding ability in its inside and on its surface, is formed of an elastic body and is composed by compounding a raw material polymer as described hereinafter with various sorts of compounding agents, from a viewpoint of preventing the abrasive from making inroads into the surface to be processed when the abrasive is injected onto the surface to be processed of the workpiece and collides with the surface.

Raw Material Polymer

The raw material polymer as a main raw material, which becomes an elastic body such as a rubber or a thermoplastic elastomer by adding various sorts of additives described hereinafter, can be used not only as solid but also as latex such as a liquid rubber or an emulsion. Moreover, from a viewpoint of reducing an impact resilience modulus of the base material and the abrasive including the base material, the raw material polymer is preferably of lower impact resilience due to its characteristics.

As the rubber, not only a natural rubber but also various sorts of synthetic rubbers can be used. For instance, an isoprene rubber, a styrenebutadiene rubber, a butadiene rubber, an acrylonitrilebutadiene rubber, a chloroprene rubber, an ethylenepropylene rubber, a chlorosulfonated polyethylene, a chlorinated polyethylene, a urethane rubber, a silicon rubber, an epichlorohydrin rubber, a butyl rubber or the like can be listed.

Further, as the thermoplastic elastomer, a styrene block copolymer, a chlorinated polyethylene elastomer, a polyester elastomer, a nitrile elastomer, a fluorinated elastomer, a silicon elastomer, an olefin elastomer, a vinyl chloride elastomer, a urethane elastomer, a polyamide elastomer, an ester halogen polymer alloy or the like are listed.

The rubbers and the thermoplastic elastomers described above as raw material polymers may be used alone, or multiple sorts of them may be mixed (used simultaneously) for use.

Furthermore, the rubber or the thermoplastic elastomer obtained by recycling collected waste products or wastes discharged in a manufacturing process may be used.

Compounding Agent

The raw material polymer is mixed with various sorts of compounding agents, and thereafter, is processed as an elastic body composing the base material.

The case of using the rubber as the raw material polymer will be described hereinafter. As the compounding agent with which the rubber polymer is mixed, there are listed various sorts of compounding agents generally used for rubber molding such as a vulcanizing agent for cross-linking between rubber molecules and a vulcanization accelerator for accelerating a cross-linking reaction by the vulcanizing agent, and in addition hereto, a plasticizer which gives plasticity to the rubber, thereby to help compounding agents to be mixed and dispersed and to improve a workability in rolling, extrusion or the like, a tackifier to impart adhesion required in manufacturing the rubber for improving a workability, a filler which not only lowers a product cost by increasing in weight but also improves physical properties (mechanical properties such as tensile strength or elasticity) or a workability of the rubber, a stabilizer, a dispersant or the like.

As the filler, in order to impart weight to the abrasive, for instance, a metal of which hardness is lower than that of the abrasive grains, ceramics, an inorganic resin or the like may be used, and they may be compounded adjustably so that an abrasive density adapted to the blast processing is obtained. Also, in order to prevent static electricity from occurring, a material having conductivity such as a carbon black or a metal grain may be used.

In the above embodiment, the raw material polymer is a rubber polymer, but as mentioned above, the thermoplastic elastomer may be used as the raw material polymer. In the case, various sorts of compounding agents generally used in molding the thermoplastic elastomer may be used.

Abrasive Grains

The abrasive grains, which have a grinding ability and play a role of polishing and cutting the workpiece in the abrasive according to the present invention, are dispersed into the base material including the raw material polymer and the compounding agents.

The abrasive grains are not limited in particular so long as they can disperse into the base material and also have a material quality that makes it possible to process the workpiece as intended with the blast processing. Various sorts of materials that are generally used as an abrasive may be used. For instance, alumina such as white alundum (WA) or alundum (A), green carborundum, diamond or the like, or by way of an example, materials shown in Table 1 described below may be used. Further, two kinds or more of the materials described above may be mixed for use.

TABLE 1

| | |
|---|---|
| Plant System | Corn Core, Seed Hull of Wallnut, Apricot, Nut, Peach or the like, Pulp, Cork |
| Metal System | Iron, Steel, Cast Iron, Cobalt, Nickel, Gallium, Zirconium, Niobium, Molybdenum, Rhodium, Palladium, Silver, Indium, Tin, Antimony Zinc, Stainless, Titanium, Vanadium, Chromium, Aluminum, Silicon, Copper, $MnO_2$, $Cr_2O_3$, Alloys Thereof |

TABLE 1-continued

| | |
|---|---|
| Ceramic System | Glass, Quartz, Alundum, White Alundum, Carborundum, Green Carborundum, Zircon, Zirconia, Garnet, Emery, Carbon Boride, Titanium Boride, Aluminum-Magnesium Boride, Boron Nitride |
| Inorganic System | Calcium Carbonate, Calcium Sulfate, Calcium Fluoride, Barium Sulfate, Barium Chloride, Aluminum Sulfate, Aluminum Hydroxide, Strontium Carbonate, Strontium Sulfate, Strontium Chloride, Titanium Oxide, Basic Magnesium Carbonate, Magnesium Hydroxide, Carbon, Graphite, Molybdenum Sulfide, Tungsten Sulfide |

A particle size of each of the abrasive grains is not limited and can be selected as necessary in accordance with a final particle diameter of the abrasive manufactured together with the base material, or the like. For instance, the abrasive grain of which the particle size is in a range from 1 mm to 0.1 μm can be used. When the mirror finishing or the like is performed to gloss the surface of the workpiece, the fine abrasive grain of which the particle diameter is equal to or less than 6 μm (equal to or more than #2000) is preferably used. In the abrasive according to the present invention, the fine abrasive grain of which the average particle diameter is less than 1 μm (equal to or more than #8000) can be used.

The shape of each of the abrasive grains also can be changed as necessary in accordance with a material quality of the workpiece, a purpose of performing the blast processing (for instance, to what extent gloss or surface roughness is imparted to the surface to be processed of the workpiece by polishing), the blast processing conditions or the like. Not only the spherical shape but also various sorts of shapes such as a polygon, a columnar shape, a flake shape, a needle shape, and its mixed shape can be widely used.

Compounding Ratio

The compounding ratio (content rate) of the abrasive grains in the abrasive is preferably within a range of 10 to 90% by weight when the abrasive content is 100% by weight.

If the content rate of the abrasive grains in the abrasive is equal to or less than 10% by weight when the abrasive amount is 100% by weight, the impact resilience modulus of the abrasive becomes larger due to an influence of the base material thereof as an elastic body, and the problem exists that after the abrasive which is injected onto the surface to be processed of the workpiece collides with the surface, it recoils without sliding on the surface or that the distance by which the abrasive slides on the surface becomes shorter. And moreover, the problem also arises that a density of the abrasive grains existing on the surface of the abrasive becomes so small that a grinding force is deteriorated and a processing ability is deteriorated.

On the other hand, when the content rate of the abrasive grains exceeds 90% by weight, the abrasive grains become dominant and a degree of bonding between the abrasive grain and the base material becomes lower. Thus, the problem arises that when the abrasive collides with the surface to be processed of the workpiece by injection, not only is the abrasive crushed seriously by collision energy but also the surface to be cut or the surface to be polished (surface to be processed) of the workpiece is satin-finished due to the crushed abrasive.

The compounding ratio of the abrasive grains in the abrasive can be preferably set to 60 to 90% by weight with respect to the abrasive of 100% by weight, which makes it possible to more suitably prevent the abrasive from being crushed while maintaining the impact resilience modulus and grinding force.

Particularly, when the content rate of the abrasive grains in the abrasive exceeds 70% by weight, even if the base material has a material quality that may cause a dust explosion, using the material, which does not cause a dust explosion, for the abrasive grain enables the dust explosion to be prevented even when the abrasive is atomized.

Furthermore, in the abrasive of the present invention, the abrasive grains are not only attached to the base material surface but also dispersed into the base material. Even when the abrasive grains existing on the base material surface of the abrasive are pulled out, separated, crushed, worn or the like due to various sorts of impacts or frictions generated in the blast processing steps such as injection onto the workpiece, polishing or cutting of the surface of the workpiece or collecting or diversion of the abrasive, new abrasive grains in the base material are exposed to the surface because the base material is also worn or crushed by the impacts or frictions in the blast processing step. Thus, a grinding ability of the abrasive can be maintained.

Therefore, the abrasive of the present invention, which is excellent in durability and does not require an abrasive regenerating step, can be used for a long period of time and a plurality of times, and can be suitably used for an abrasive recycling process line. Exposure of the new abrasive grains as described above can be suitably achieved by appropriately changing the material quality of the base material, the compounding ratio (content) of the abrasive grains in the abrasive, a productive process or the like to adjust a wear or crush rate of the base material, brittleness of the abrasive or the like.

Method for Manufacturing

The abrasive of the present invention, when the above-described rubber (raw material rubber) is used as a raw material polymer, can be manufactured through known rubber manufacturing steps.

Generally, rubber products are manufactured through the following four steps: a kneading step, a rolling/extruding step, a forming step and a vulcanizing step. Hereinafter, a method of manufacturing the abrasive according to the present invention will be described along the four steps.

First, in the kneading step, the raw material rubber is masticated (a mechanical shear force is applied to the raw material rubber for loosening an aggregation of molecules, cleaving a molecule chain thereof, or the like, and thus, plasticity and fluidity of the rubber are adjusted to a level where the mixing of the compounding agents or the forming can be easily performed). After that, the kneading (the masticated raw material rubber and the compounding agents are mixed, and the mechanical shear force is applied hereto for imparting plasticity to the rubber and dispersing the compounding agents into the rubber) is performed. In the present invention, the abrasive is composed of the base material and the abrasive grains dispersed therein, so the kneading is performed by adding the abrasive grains as well as the compounding agents such as the vulcanizing agent or the filler in the kneading step.

For the mastication or the kneading in the kneading step, various sorts of kneaders publicly known can be used. For instance, a closed type kneader represented by a Bambury mixer, an open roll mill, a kneader, an agitator capable of kneading with the use of a shear force, or the like can be listed.

Next, the operation goes to a rolling/extruding step, where the raw material which is kneaded with the compounding agents or the abrasive grains and of which plasticity is adjusted is processed into a flat-plate shape, a sheet shape, an aggregated shape or the like so as to be formable in the subsequent forming step.

As a device used in the step, a calendar with a plurality of rolls aligned, an extrusion machine provided with a screw, or the like can be listed.

The raw material, which is processed into an appropriate shape in the rolling/extruding step as described above, is formed in a predetermined size and shape in the forming step. In the present invention, the abrasive is manufactured, so the raw material of a flat-plate shape, a sheet shape or an aggregated shape is crushed into pieces of a pellet shape in order to atomize it, which are screened to a specified particle size. In crushing, various sorts of crushers that are publicly known can be used.

After that, the granule obtained in the forming step is heated in the vulcanizing step and the vulcanizing agent included in the granule triggers a cross-linking reaction, and thus, the base material except the abrasive grains is processed into an elastic body. In the vulcanizing step, various sorts of known devices can also be used. For instance, a press, a vulcanizer, an extrusion-type continuous vulcanizing machine or the like can be listed.

The formation into the granule (forming step) and the cross-linking by vulcanization (vulcanizing step) can be performed in reverse order. For instance, it is possible that the raw material processed in an appropriate shape in the rolling/extruding step is shifted to the vulcanizing step as it stands for being processed into an elastic body, which is thereafter crushed into granules in the forming step.

Moreover, when the thermoplastic elastomer is used as the raw material polymer, the abrasive of a desired particle size can be manufactured through known processing steps of the thermoplastic elastomer. The steps include a kneading step of performing mastication of the raw material polymer and kneading the raw material polymer with compounding agents and the abrasive grains added; a forming step of heating the kneaded raw material at a temperature equal to or more than a melting point thereof and performing extrusion/injection or the like of the melted raw material; and a crushing step of crushing the elastic body formed as described above and screening it so that the abrasive is of specified particle size. It should be noted that in the kneading step, a roll, a pressurizing kneader, an internal mixer or the like can be used by way of an example.

Blast Processing Method

The method for blast processing of the present invention is a method of, by injecting or projecting the abrasive of the present invention onto the surface to be processed of the workpiece, to perform the polishing, the cutting or the like for the surface so that the surface is processed into a desired state such as mirror-finishing, deburring, cleaning or patterning.

The method for blast processing of the present invention can be implemented by using various sorts of known blast processing devices, and in the embodiment, the case of using a pneumatic blast processing device to inject the abrasive with a compressed fluid will be described. However, in addition to the device described above, mechanical blast processing devices such as a centrifugal type one and a flat casting type one may be used for projecting the abrasive.

Injection of Abrasive

The injection of the abrasive can be performed with the use of various sorts of known blast processing devices to inject the abrasive accelerated by the compressed fluid. When the pneumatic processing device is used as the blast processing device, if the abrasive can be injected from an injection gun with the compressed fluid, any of dry types such as a direct pressure type, a siphon type and a gravity type, and a wet type such as liquid honing may be applicable and its type is not limited in particular. From a viewpoint of saving energy, the direct pressure type one, which is excellent in efficiency of the output to the consumption electric power and permits the input energy to be effectively used, is preferable.

Moreover, as for the compressed fluid to accelerate the abrasive, any of gases, liquids, its mixture, or the like may be applicable. By way of an example, the compressed air or the other compressed gases, for instance, a nitrogen gas, an argon gas or a carbon dioxide gas may be used. Each of the compressed gases described above may be used alone, or multiple sorts of the gases may be mixed for use.

The injection pressure of the compressed fluid, which can impart desired speed energy to the abrasive when the abrasive is injected from the injection gun, may be applicable, can be selected from among various ranges in accordance with a purpose of the processing (polishing, cutting or the like), the abrasive for use, a material quality of the workpiece, the processing conditions and the other various sorts of conditions, and is not limited in particular if the injection pressure is equal to or more than an atmospheric pressure and yet in a range in which the injection energy can be controlled. By way of an example, the injection pressure can be 0.01 MPa to 1.0 MPa.

Adjustment of Angle of Incidence of Abrasive to Workpiece

As described above, in the method for blast processing according to the present invention, by making it possible that the abrasive of the present invention of which the base material is an elastic body is injected onto the surface to be processed of the workpiece, and the abrasive colliding with the surface to be processed slides on the surface without recoiling, the polishing, the cutting or the like is performed for the surface while the satin-finished uneven portions are prevented from being formed on the surface.

Therefore, so long as the abrasive injected onto the surface to be processed of the workpiece can slide on the surface smoothly, an angle of incidence θ of the abrasive with respect to the surface to be processed (angle formed between an injection direction of the abrasive and the surface to be processed) can be arbitrarily selected. Specifically, the angle of incidence θ is preferably 0 to 70°, further preferably equal to or less than 60°. By way of an example, the angle of incidence θ may be 45°.

In the processing such as the polishing for mirror finishing, which requires that the distance by which the abrasive slides on the surface to be processed of the workpiece be made longer, the angle of incidence is preferably made further smaller. The smaller the angle of incidence is, the longer the distance by which the abrasive slides on the surface to be processed of the workpiece can be made.

Workpiece

In the method for blast processing according to the present invention, each of products having various sorts of material qualities, which become an object of polishing or cutting, can be used as a workpiece. The method for blast processing can be applied to the workpiece made of a carbon steel, a tool steel, a high-speed steel, a bearing steel, a stainless steel, a cemented carbide, an aluminum and its alloy, a copper and its alloy, a magnesium alloy, a titanium and its alloy, glass, quartz, ceramics, plastic or the like as a concrete example.

EMBODIMENT

Existing Situation Test of Abrasive Grains in Abrasive

Immediately After Manufacturing

The surface of the abrasive according to the present invention immediately after manufacturing was observed with a scanning electron microscope (SEM) and together therewith, an elemental analysis (surface analysis) of a region corresponding to a SEM image was implemented with an energy dispersive X-ray analyzer placed with the SEM device and a composition analysis thereof was performed. As the device, HORIBA EMAX manufactured by Horiba, Ltd. was used. The result is shown in FIG. 1.

It should be noted that as a base material of the abrasive, the butadiene-acrylonitrile copolymer (NBR) was used, and as abrasive grains, the white alundum (alumina) was used.

From the SEM image (FIG. 1(A)), it was observed that a high-density of abrasive grains was exposed to the abrasive surface. Also, an image of a detection signal of aluminum (FIG. 1(B)) as a result of the composition analysis nearly corresponded to each surface shape of the SEM image of FIG. 1(A), and as for a detection signal of oxygen (not shown), a similar image was obtained. Thus, it was confirmed that the abrasive grain was alumina (white alundum) including aluminum and oxygen.

After Use

Moreover, in order to confirm durability of the abrasive according to the present invention, the abrasive was used in the blast processing, and the existing situation of the abrasive grains on the abrasive surface after the blast processing was observed with the scanning electron microscope (SEM). It should be noted that as a base material of the abrasive, the butadiene-acrylonitrile copolymer (NBR) was used, and as abrasive grains, the green carborundum of a particle size of #10000 was used.

In the blast processing, with the use of a pneumatic blast processing device FDQ3 (manufactured by Fuji Manufacturing Co., Ltd.) with a nozzle diameter of 5 mm and an abrasive tank capacity of 500 g, the abrasive was injected onto the surface to be processed of the workpiece made of SUJ-2 at an injection pressure of 0.5 MPa, at an injection distance (a distance X from a tip of a nozzle 20 to the surface to be processed 10 of the workpiece in a injection direction) of 50 mm, at an injection angle (angle of incidence θ) of 45°, at an injection quantity of 1 kg/min, and for 28 hours. This enabled the condition of the abrasive after approximately 3000 shots to be observed.

Figure 2:
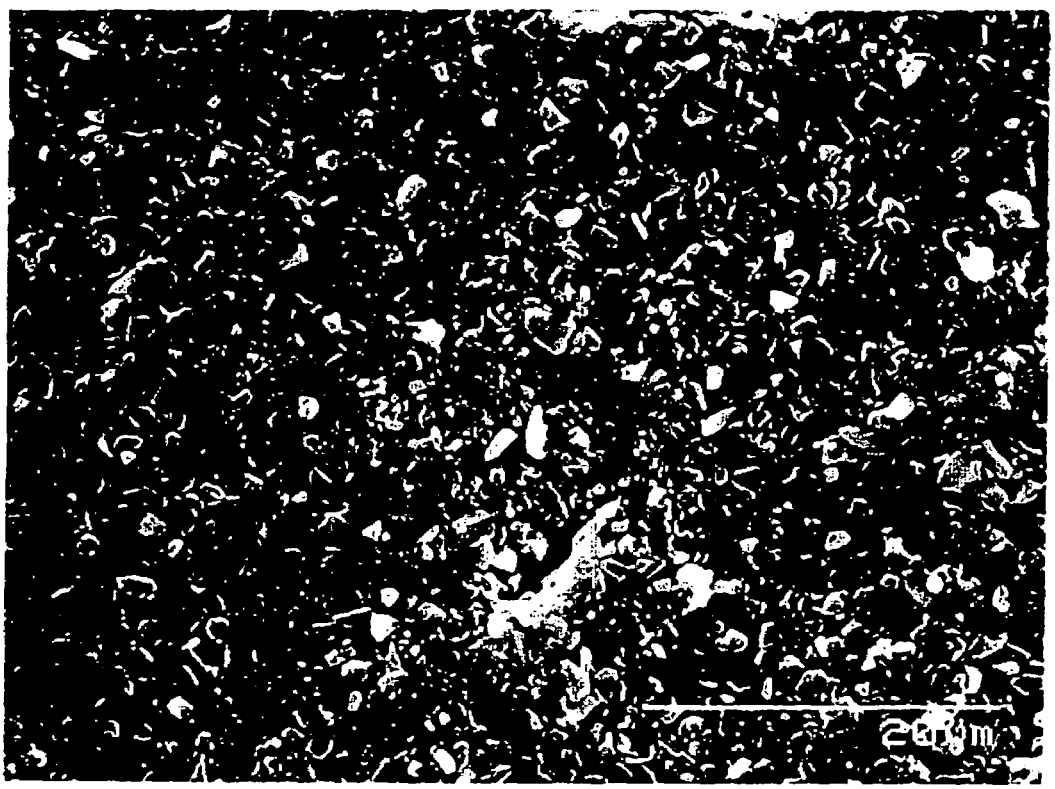
FIG. 2 is a scanning electron microscope (SEM) image as a surface observation result of the abrasive according to the present invention after being used in the blast processing.

As a result, according to the SEM image (FIG. 2), the state in which an existing rate of the abrasive grains on the abrasive surface was lowered, for instance, the state in which the abrasive grains fell off the abrasive surface was not observed, and it was confirmed that the condition of the abrasive was substantially the same as that of the abrasive before use in the blast processing.

Cutting Test

Figure 3:
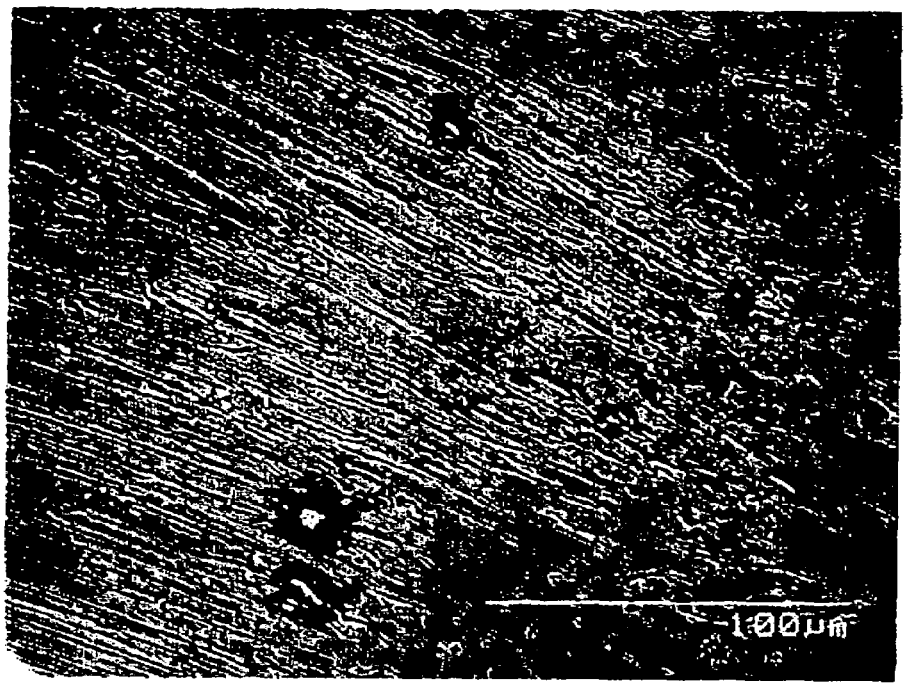
FIG. 3 is an enlarged view showing a dense part of cutting traces in a processed surface of a workpiece as a result of a cutting test with the abrasive according to the present invention. (A) is shown at 500-fold magnification and (B) is shown at 1000-fold magnification.
Figure 3:
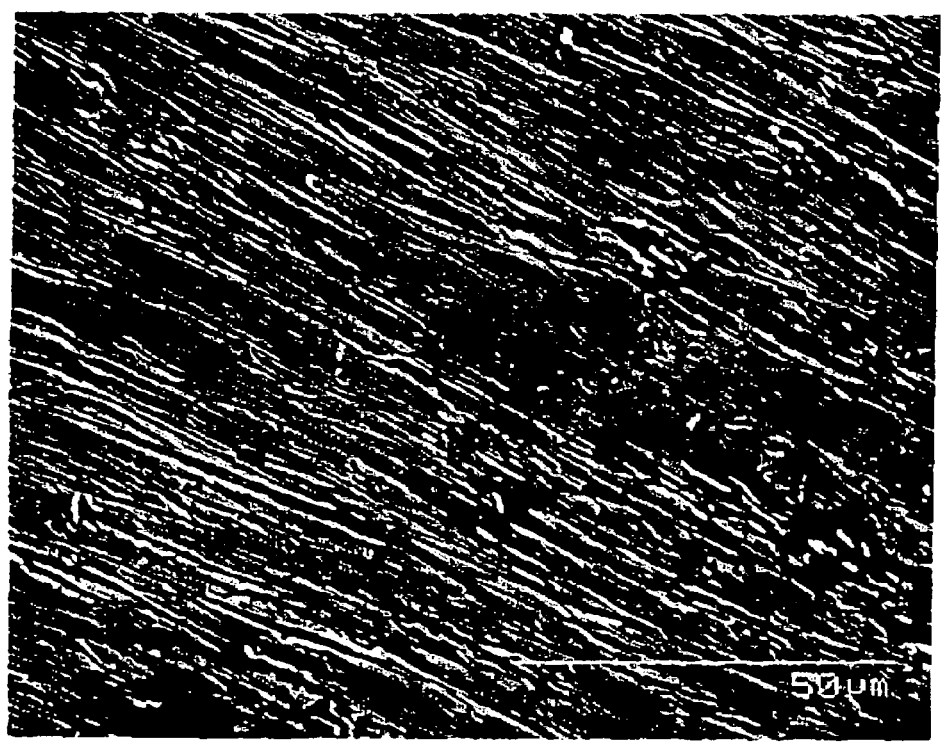

In order to confirm a cutting ability of the abrasive according to the present invention, a mirror-finished bearing steel SUJ-2 was used as a workpiece, and blast-processed with the abrasive, and a cutting trace of the surface of the workpiece was observed (FIG. 3). In the abrasive, the butadiene-acrylonitrile copolymer (NBR) was used as the base material, and the white alundum (alumina) of which the average particle diameter was 0.8 mm (a particle size of each abrasive grain was #3000) was used as the abrasive grains. As a blast processing device, the pneumatic blast processing device FDQ3 (manufactured by Fuji Manufacturing Co., Ltd.) with a nozzle diameter of 5 mm was used. The abrasive was injected onto the surface to be processed of the workpiece at an injection pressure of 0.5 MPa, at an injection distance of 50 mm, and at an injection angle of 45°.

As a result, according to FIG. 3, there were formed many linear cutting traces extending along an injection direction of the abrasive on the processed surface of the workpiece. Therefore, according to the abrasive of the present invention, it was confirmed that satin-finished uneven portions was able to be suitably prevented from being formed on the surface of the workpiece and yet that the abrasive slid on the surface, thereby making it possible to cut the surface substantially in parallel.

Polishing Test

The blast processing was performed for the workpiece made of various sorts of materials with the use of the abrasive of the present invention to confirm its polishing condition.

In confirming the polishing condition, surface roughness Ra, Ry, Rz on the processed surface in each of the embodiments and comparative examples were obtained, and in addition hereto, roughness curves of the processed surface was obtained and graphed with an instrument for measuring surface roughness shape SURFCOM 130A (manufactured by TOKYO SEIMITSU CO., LTD).

Polishing Test 1

As a comparative example 1, a soda glass used as a workpiece was blast-processed with the abrasive of a particle size of #600 made of alundum (Fujilundum manufactured by Fuji Manufacturing Co., Ltd.) at an injection angle of 90°. As an embodiment 1, the workpiece obtained in the comparative example 1 was blast-processed with the abrasive according to the present invention (hereinafter referred to as "abrasive A") having an average particle diameter of 0.8 mm, which includes the white alundum of a particle size of #4000 as abrasive grains and the butadiene-acrylonitrile copolymer as a base material, at an injection angle of 45°. As an embodiment 2, the workpiece obtained in the embodiment 1 was further blast-processed with the abrasive according to the present invention (hereinafter referred to as "abrasive B") having an average particle diameter of 0.8 mm, which includes the white alundum of a particle size of #8000 as abrasive grains and the butadiene-acrylonitrile copolymer as a base material, at an injection angle of 45°. The condition of each processed surface was confirmed. It should be noted that the abrasives A and B were injected with a pneumatic blast processing device SFK-2 provided with a gun (nozzle) of type 3 (manufactured by Fuji Manufacturing Co., Ltd.) at an injection pressure of 0.5 MPa, at an injection distance of 50 mm, at an injection quantity of 500 g/min and for an injection time of 30 seconds.

Consequently, each surface roughness thereof was obtained as shown in the following Table 2, and each roughness curve thereof was obtained as shown as in FIG. 4 to 6.

TABLE 2

| Surface Roughness(μm) | Ra | Ry | Rz |
|---|---|---|---|
| Comparative Example 1 | 0.75 | 5.44 | 3.58 |
| Embodiment 1 | 0.53 | 3.26 | 2.22 |
| Embodiment 2 | 0.38 | 2.20 | 1.55 |

According to the result of the surface roughness and roughness curve, as compared to comparative example 1 in which the abrasive formed of only the material having a grinding ability was injected at an injection angle of 90° onto the surface and the satin-finished uneven portions were formed, the surface roughness of each processed surface was reduced in the embodiments 1 and 2 because the workpiece obtained in the comparative example 1 was further blast-processed with the abrasive of the present invention. Particularly, in the embodiment 2, the surface roughness was largely reduced as compared to the comparative example 1 because the workpiece obtained in the embodiment 1 was blast-processed with the abrasive including abrasive grains each having a further smaller particle size.

Figure 4:
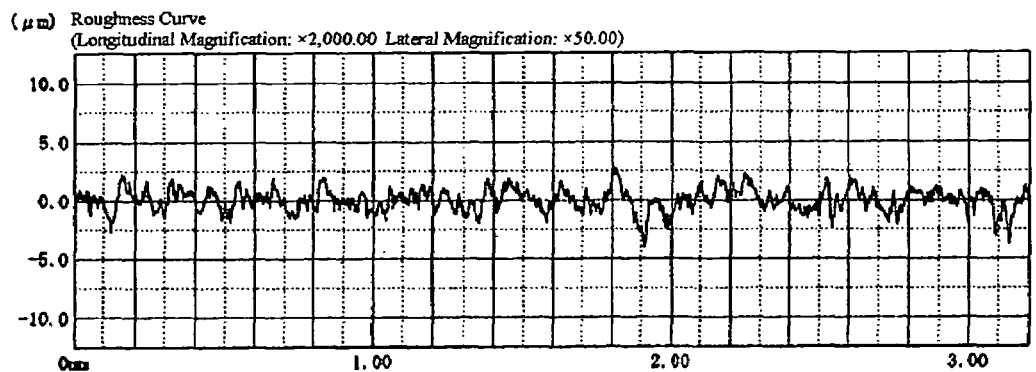
FIG. 4 is a graph showing a roughness curve in a comparative example 1.
Figure 5:
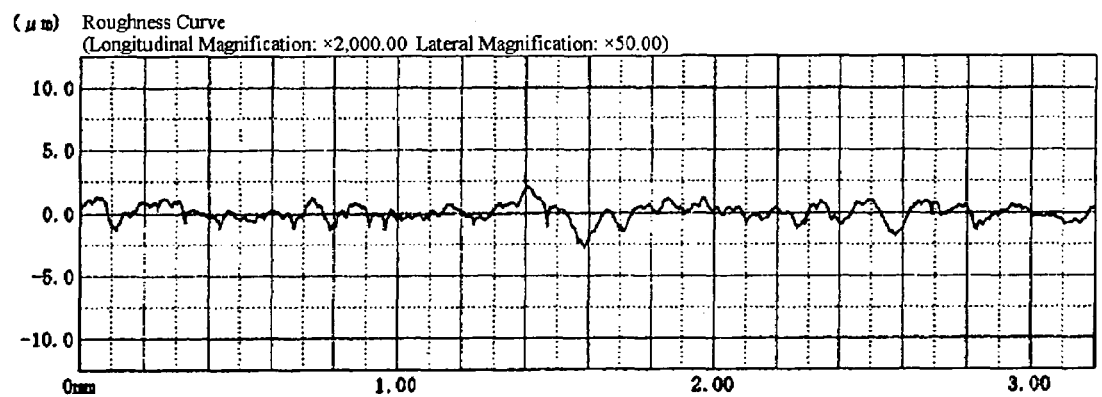
FIG. 5 is a graph showing a roughness curve in an embodiment 1.
Figure 6:
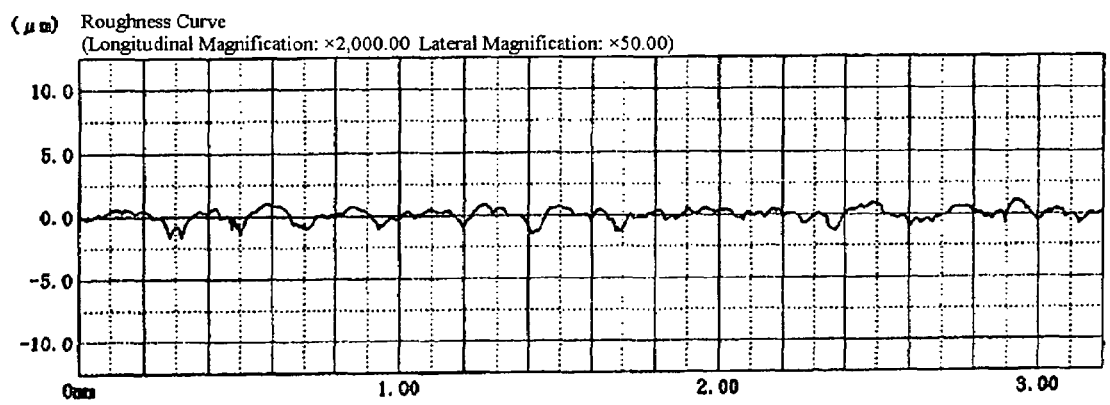
FIG. 6 is a graph showing a roughness curve in an embodiment 2.

Furthermore, according to the roughness curve shown in each of FIG. 4 to 6, each of uneven portions thereof forms an acute angle in the comparative example 1 (FIG. 4), whereas in the embodiment 1 (FIG. 5) and the embodiment 2 (FIG. 6), each of uneven portions thereof (convex portions in particular) was rounded, whereby the surface thereof was smooth.

Therefore, it was confirmed that the polishing was performed well with the abrasive according to the present invention.

Polishing Test 2

As a comparative example 2, SKD11 used as a workpiece was blast-processed with Steel Shot #300 (steel beads manufactured by Fuji Manufacturing Co., Ltd.) as an abrasive at an injection angle of 90°. As an embodiment 3, the workpiece obtained in the comparative example 2 was blast-processed with the abrasive B of the present invention at an injection angle of 45°. The condition of each processed surface thereof was confirmed. It should be noted that the abrasive was injected with the pneumatic blast processing device FDQ3 (manufactured by Fuji Manufacturing Co., Ltd.) of which the nozzle diameter was 5 mm at an injection pressure of 0.5 MPa and at an injection distance of 50 mm.

Figure 7:
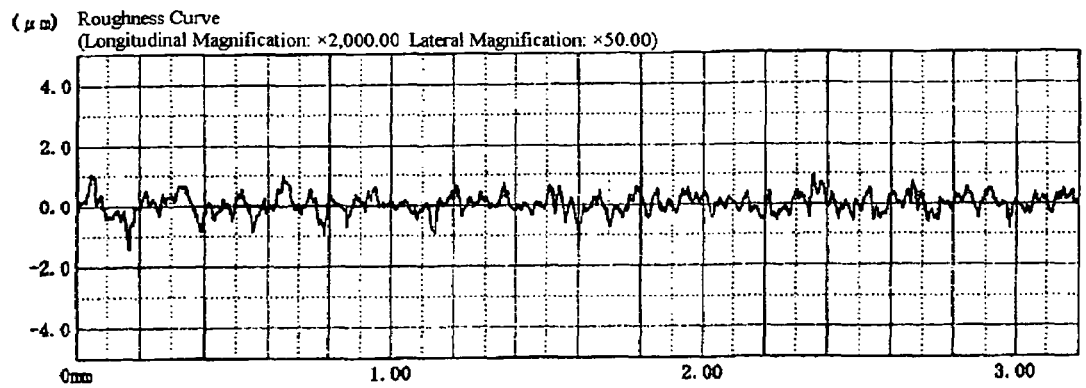
FIG. 7 is a graph showing a roughness curve in a comparative example 2.
Figure 8:
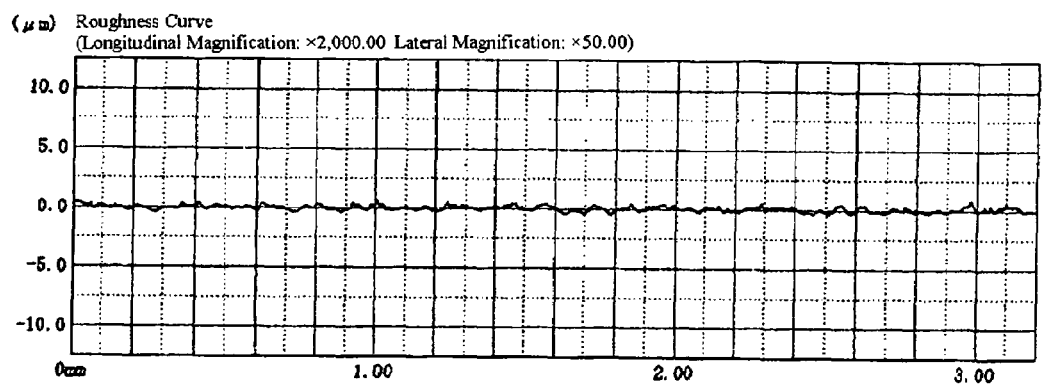
FIG. 8 is a graph showing a roughness curve in an embodiment 3.

Consequently, each surface roughness thereof was obtained as shown in the following Table 3, and further, each roughness curve thereof was obtained as shown as in FIGS. 7 and 8.

TABLE 3

| Surface Roughness(μm) | Ra | Ry | Rz |
|---|---|---|---|
| Comparative Example 2 | 0.25 | 1.98 | 1.41 |
| Embodiment 3 | 0.16 | 1.13 | 0.81 |

From the results, it was found that it was possible to suitably smooth the rough and satin-finished surface of the workpiece, and to perform the desired polishing with the abrasive according to the present invention.

Polishing Test 3

As a comparative example 3, SUP3 used as a workpiece was blast processed with the abrasive of a particle size of #600 made of the alundum (Fuji lundum manufactured by Fuji Manufacturing Co., Ltd.) at an injection angle of 90°. As an embodiment 4, the workpiece obtained in the comparative example 3 was blast-processed with the abrasive A of the present invention at an injection angle of 45°. As an embodiment 5, the workpiece obtained in the embodiment 4 was further blast-processed with the abrasive B of the present invention at an injection angle of 45°. The condition of the processed surfaces thereof was confirmed. It should be noted that the abrasive was injected with the pneumatic blast processing device FDQ3 (manufactured by Fuji Manufacturing Co., Ltd.) of which the nozzle diameter was 5 mm at an injection pressure of 0.5 MPa at an injection distance of 50 mm.

Figure 9:
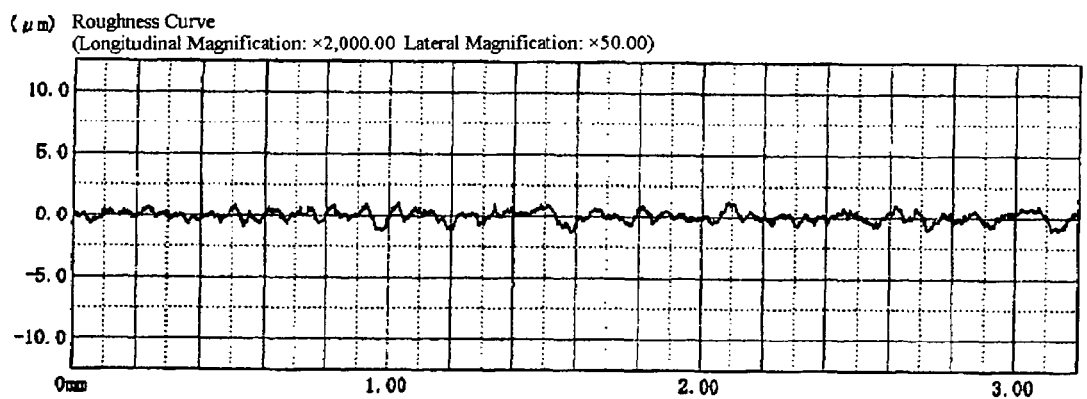
FIG. 9 is a graph showing a roughness curve in a comparative example 3.
Figure 10:
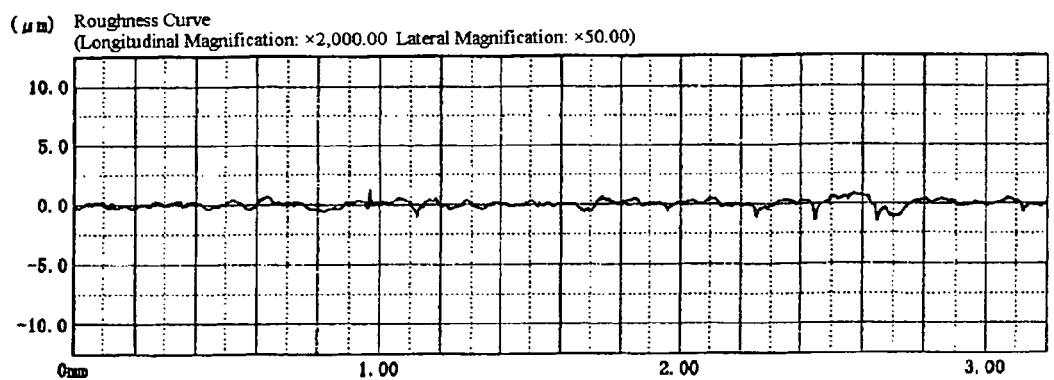
FIG. 10 is a graph showing a roughness curve in an embodiment 4.
Figure 11:
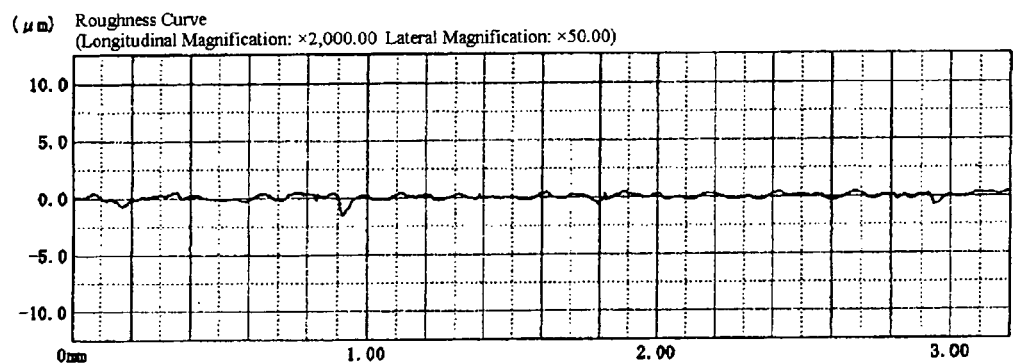
FIG. 11 is a graph showing a roughness curve in an embodiment 5.
Figure 12:
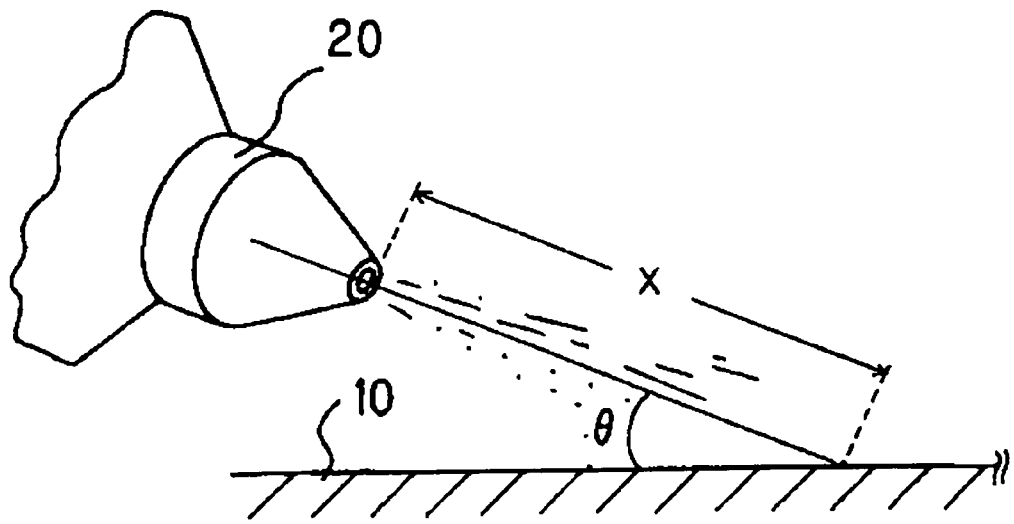
FIG. 12 is a view illustrating a state of the blast processing in this embodiment.

Consequently, each surface roughness thereof was obtained as shown in the following Table 4, and further, each roughness curve thereof was obtained as shown as in FIG. 9 to and 11.

TABLE 4

| Surface Roughness(μm) | Ra | Ry | Rz |
|---|---|---|---|
| Comparative Example 3 | 0.35 | 2.17 | 1.72 |
| Embodiment 4 | 0.24 | 1.84 | 1.15 |
| Embodiment 5 | 0.18 | 1.38 | 0.82 |

From the results, it was found that it was possible to suitably smooth the rough and satin-finished surface of the workpiece, and to perform the desired polishing with the abrasive according to the present invention. In particular, it can be said safely that using the abrasive of which a particle size of each abrasive grain is smaller allows the polishing to be more effectively performed.

The abrasive of the present invention, as described above, can be used suitably in carrying out polishing or cutting for performing mirror finishing, gloss finishing or the like for the surface to be processed of the workpiece, and additionally, can be used in various sorts of blast processing such as deburring, cleaning, and also improving of adhesiveness of a coating layer.

Thus the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;

EXPLANATION OF NUMERALS 10 machined surface (of a workpiece)
20 nozzle (of a blast processing device)

What is claimed is:

1. An abrasive for blast processing a surface to be processed of a workpiece, comprising:
    a base material as an elastic body; and
    abrasive grains, wherein the abrasive grains of 10 to 90% by weight are compounded and dispersed into the base material of 90 to 10% by weight,
    a) a portion of said abrasive grains communicating with an exterior surface of said base material as said elastic body;
    b) said base material including a raw material polymer and compounding agents in order to adjust an impact resilience modulus of said base material;
    c) said compounding agents including a filler for obtaining an abrasive density adapted to the blast processing;
        a1) said base material having a property of wearability and crushability by impacts or frictional engagement with said surface to be processed of the workpiece during said blast processing, and
        said abrasive gains are continually exposed said communicating portions with said base material onto said exterior surface;
        a2) said base material providing means to cushion impact force of said abrasive against said surface to be processed of the workpiece during said blast processing;
        a3) said base material providing lower impact resilience to said abrasive subsequent to impacting said surface to be processed of the workpiece, said lower impact resilience being a resilience provided to minimize recoil of said abrasive from said surface to be processed of the workpiece as well as allowing said abrasive to slide across said surface to be processed of the workpiece subsequent to impacting said surface to be processed of the workpiece; and
    d) said abrasive being formed into a granule.

2. The abrasive for blasting a surface to be processed of a workpiece according to claim 1, wherein the abrasive grains of equal to or more than 60% by weight are compounded.

3. A method for manufacturing of an abrasive for blast processing a surface to be processed of a workpiece according to claim 1, comprising the steps of:
    preparing a base material as an elastic body by mixing a raw material polymer, compounding agents and fillers for obtaining an abrasive density adapted to the blast processing in order to adjust an impact resilience modulus of said base material,
    compounding and dispersing abrasive grains of 10 to 90% by weight into/with said base material of 90 to 10% by weight by kneading abrasive grains with said base material, whereby communicating a portion of said abrasive grains with an exterior surface of said base material as said elastic body;
    during said kneading, allowing a communication of a portion of said abrasive grains with said exterior surface of said base material as said elastic body;
    then, forming said mixture of abrasive grains with said base material into a granule, and
    during said blast processing, said abrasive grains are continually exposed said communicating portions with said base material onto said exterior surface.

4. A method for blast processing, comprising the step of injecting or projecting the abrasive according to claim 1 at an angle of incidence, said angle of incidence being inclined at a predetermined angle with respect to a surface to be processed of a workpiece.

5. The method for blast processing according to claim 4, wherein the angle of incidence is 0 to 70°.

6. A method for blast processing, comprising the step of injecting or projecting the abrasive according to claim 2 at an angle of incidence, said angle of incidence being inclined at a predetermined angle with respect to a surface to be processed of a workpiece.

7. The method for blast processing according to claim 6, wherein the angle of incidence is 0 to 70°.

8. An abrasive for blast processing a surface to be processed of a workpiece according to claim 1, wherein said filler comprises ceramics, an inorganic material, a resin, a metal of which hardness is lower than that of the abrasive grains, or a material having conductivity such as a carbon black or a metal grain.

9. The abrasive for blasting a surface to be processed of a workpiece according to claim 8, wherein the abrasive grains of equal to or more than 60% by weight are compounded.

10. A method for manufacturing of an abrasive for blast processing a surface to be processed of a workpiece according to claim 3, comprising the steps of:
    kneading abrasive grains of 10 to 90% by weight with a polymer raw material and a compounding agent having a filler comprising ceramics, an inorganic material, a resin, a metal having a hardness is lower than that of the abrasive grains, or a material having conductivity such as a carbon black or a metal grain as a base material of 90 to 10% by weight; and, then, forming the abrasive into a granule.

11. A method for blast processing, comprising the step of injecting or projecting the abrasive according to claim 8 at an angle of incidence, said angle of incidence being inclined at a predetermined angle with respect to a surface to be processed of a workpiece.

12. The method for blast processing according to claim 11, wherein the angle of incidence is 0 to 70°.

13. A method for blast processing, comprising the step of injecting or projecting the abrasive according to claim 9 at an angle of incidence, said angle of incidence being inclined at a predetermined angle with respect to a surface to be processed of a workpiece.

14. The method for blast processing according to claim 13, wherein the angle of incidence is 0 to 70°.

15. An abrasive for blast processing a surface to be processed of a workpiece according to claim 8, wherein said filler comprises a combination of ceramics, an inorganic material, a resin, a metal of which hardness is lower than that of the abrasive grains, or a material having conductivity such as a carbon black or a metal grain.

16. An abrasive for blast processing a surface to be processed on a workpiece, comprising:
   said abrasive formed as a granule of base material and abrasive grains;
   said base material including a raw material polymer, and compounding agents having a filler, said base material formed to an elastic body;
   said abrasive grains compounded and dispersed into the base material at a ratio of 90 to 10% by weight;
   a portion of said abrasive grains communicating with an exterior surface of said elastic body;
   portions of said exterior surface adjacent to said portion of said abrasive grains communicating therewith, being wearable and crushable by impacts or frictional engagement with said surface to be processed thereby providing means to continually expose additional of said communicating portions with said exterior surface;
   said base material providing means to cushion impact force of said abrasive against said surface to be processed of the workpiece during said blast processing;
   said base material providing a means for a lower impact resilience of said abrasive subsequent to impacting said surface to be processed, said lower impact resilience providing a means to minimize recoil of said abrasive from said surface to be processed subsequent to impacting said surface to be processed.

17. A method for manufacturing of an abrasive for blast processing a surface to be processed of a workpiece according to claim 16, comprising the steps of:
   preparing a base material as an elastic body by mixing a raw material polymer, compounding agents and fillers, in proportions to yield wearable and crushable said elastic body;
   kneading abrasive grains with base material at a ratio of 90 to 10% by weigh by kneading said abrasive gains with an exterior surface of said elastic body formed of said base material;
   during said kneading, allowing a communication of a portion of said abrasive grains with said exterior surface of said base material as said elastic body;
   during said kneading leaving portions of said exterior surface exposed to form wearable crushable portions of said exterior surface adjacent to said portion of said abrasive grains, said wearable crushable portions providing a means to expose additional said portions of said abrasive grains by a wearing and crushing of said portions of said exterior surface during impacts with said surface to be processed during said blast processing; and
   then, forming said mixture of abrasive grains and said base material into a granule.

* * * * *